United States Patent [19]

Henk

[11] 4,410,120
[45] Oct. 18, 1983

[54] GEARS FOR WEB TRANSPORT
[75] Inventor: Keith L. Henk, Brooklyn Park, Minn.
[73] Assignee: Pako Corporation, Minneapolis, Minn.
[21] Appl. No.: 327,355
[22] Filed: Dec. 4, 1981
[51] Int. Cl.³ .......................................... B65H 17/42
[52] U.S. Cl. .................................. 226/109; 242/55.01
[58] Field of Search .................... 242/55.01; 226/118, 226/119, 109; 74/461–468, DIG. 10, 640; 403/355–358, 318; 354/297, 318–322

[56] References Cited

U.S. PATENT DOCUMENTS

| | | | |
|---|---|---|---|
| 479,233 | 7/1892 | Walker | 403/318 |
| B 540,632 | 1/1976 | Laitner, Jr. | 403/318 |
| 958,955 | 5/1910 | Cullman | 403/356 |
| 1,449,341 | 3/1923 | Mills et al. | 403/358 |
| 2,123,445 | 7/1938 | Van Leuven | 242/55.01 |
| 3,169,408 | 2/1965 | Rouverol | 74/461 |
| 3,457,234 | 7/1969 | Gianatasio | 74/DIG. 10 |
| 3,743,195 | 7/1973 | Bagdasarian | 242/55.01 |

Primary Examiner—Leonard D. Christian
Attorney, Agent, or Firm—Kinney, Lange, Braddock, Westman and Fairbairn

[57] ABSTRACT

A retaining mechanism securely retains a gear in a fixed position on a shaft of a drive system in a photographic processor. The retaining mechanism includes a woodruff key which is held in position between the gear, preferably in a keyway in the gear, and an arcuate keyway in the shaft. The key has a first end portion which is engaged by a set screw and a second end portion which deformably engages an interior surface of the keyway of the gear. The set screw extends through a bore in the gear and has a head portion with a diameter slightly greater than the diameter of the bore. The set screw engages the first end portion of the key with its distal end, thereby tipping the key so that the second end portion of the key engages the interior surface of the keyway of the gear. The gear is made of a material, preferably an ultra-high molecular weight polyethylene, which can be initially deformed by interference with the head of the set screw and, remains deformed, effectively retaining the set screw in a fixed position. As a result, the set screw securely retains the second end portion of the key in engagement with the surface of the keyway of the gear, which in turn securely retains the gear on the shaft.

18 Claims, 9 Drawing Figures

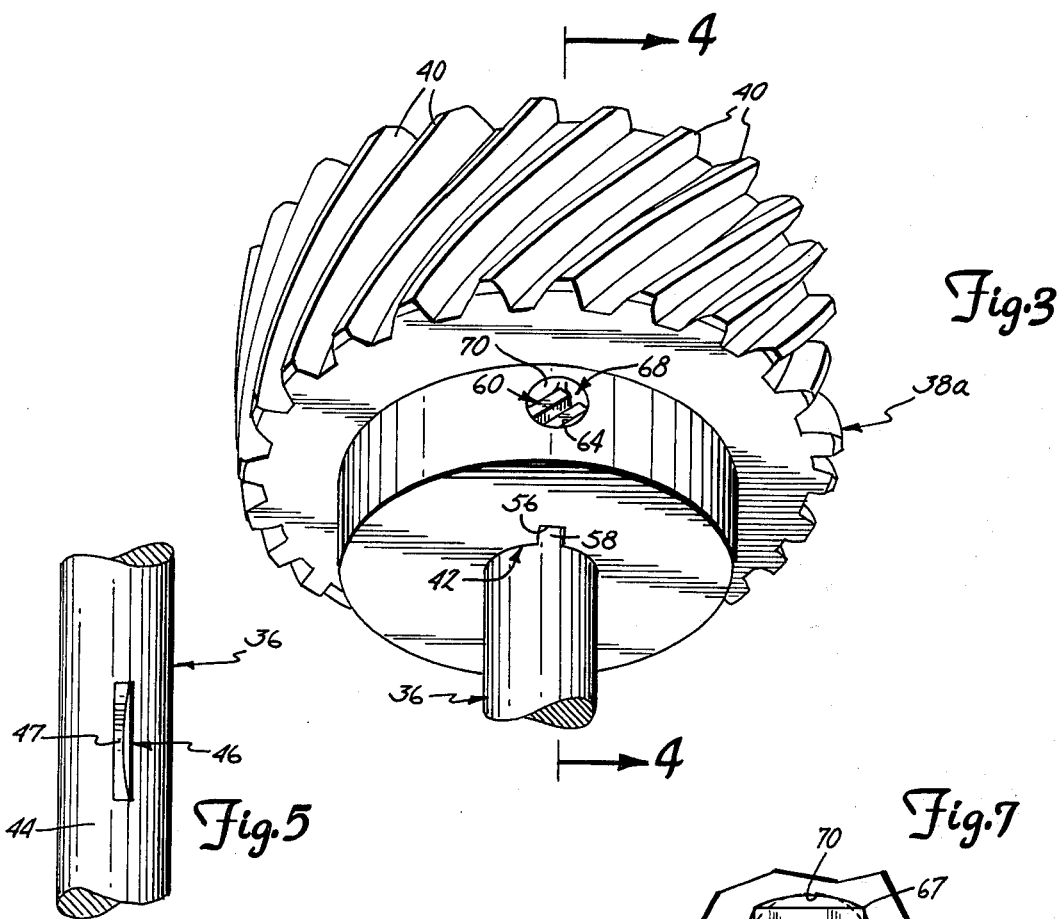
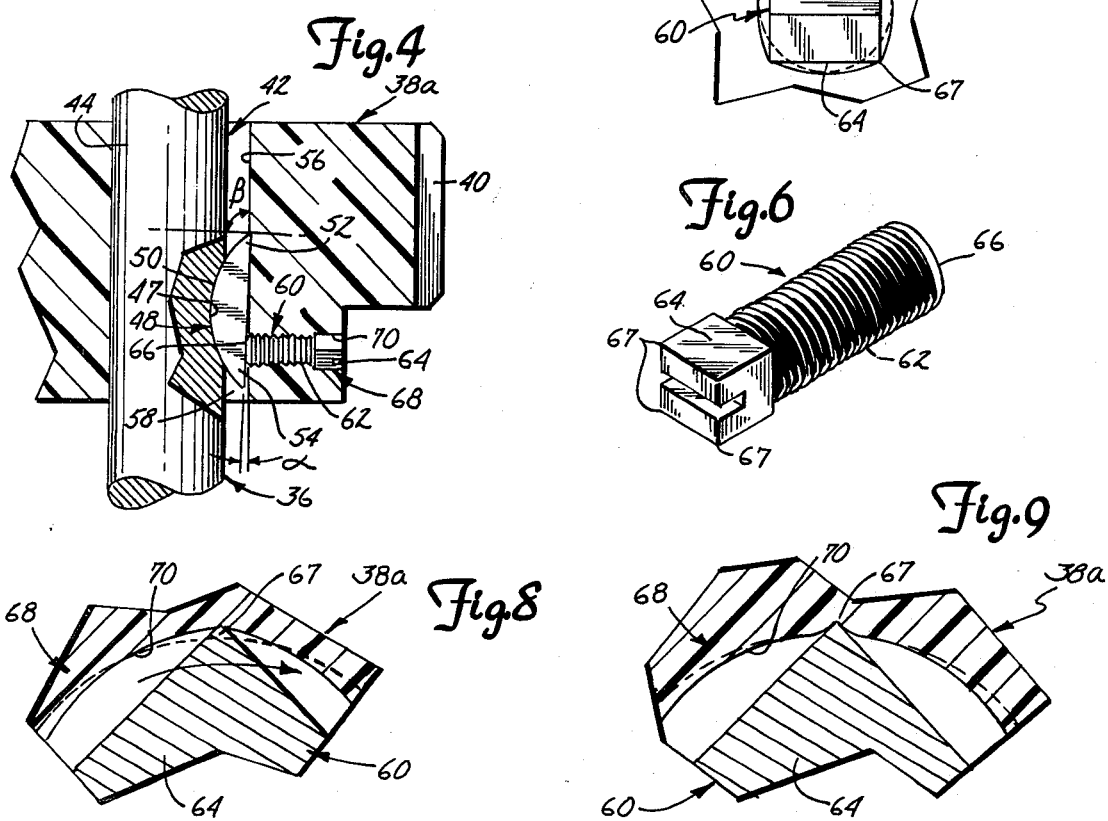

GEARS FOR WEB TRANSPORT

BACKGROUND OF THE INVENTION

1. Field of the Invention.

The present invention relates to drive systems in photographic processors. In particular, it relates to apparatus for securely retaining a gear on a drive shaft of a drive system in a photographic processor.

2. Description of the Prior Art.

In photofinishing, it is typical to continuously process long webs of photosensitive material by transporting the web through a series of processing tanks which contain different chemical solutions, and then through a dryer that dries the web. Both photographic film and photographic print paper are commonly processed in this manner.

In the case of photographic film, it is typical to splice together individual strips of undeveloped photographic film for processing. Cine processor machines are used to develop continuously the long webs of photographic film formed by splicing the individual strips of film.

In a cine processor, the film web is transported through the tanks by sets of transport rollers. One successful type of transport system used in cine processors is known as the "cradle drive" system. In this system, each tank has a transport rack with an upper and lower shaft on which are mounted a plurality of transport rollers. A drive shaft near the bottom of the rack engages edges of the lower set of transport rollers. This drive shaft is driven through a gear train by the cine processor drive system. The film web enters a transport rack on one side, and is transported in a spiral manner between the upper idler rollers and lower driven rollers of the rack until it reaches the other side of the rack, where it is transferred to the next transport rack.

As is easily apparent, any malfunction in the processor drive system results in costly downtime and possible damage to the photosensitive web. An important component of the drive system is the gears that transfer power from a main drive shaft to the drive shafts of the transport racks. The gears must be made of a material that is resistant to chemical attack from the various chemical solutions used in the processor.

Of particular importance is the manner in which the gears are attached to their respective shafts. In the past, any vibration present in the drive systems of cine processors has tended to loosen the set screws holding the gears on the shaft. Unless periodic maintenance checks are performed and set screws retightened as necessary, breakdowns of the drive system are likely to occur. This periodic inspection of the set screws is time consuming and inconvenient, particularly since lower gears typically are not easily accessible. They are, however, extremely critical and important. A relatively large number of gear assemblies are normally employed in a photographic processor. Also, in equipment used to process original film, failure can cause the loss of a significant quantity of irreplaceable material. Obviously, these risks become greater as the size and capacity of processors increase.

SUMMARY OF THE INVENTION

The present invention is an improved gear and retaining mechanism for retaining the gear in a fixed position on a shaft in a drive system of a photographic processor. The gear preferably has a keyway with a deformable interior surface coaxially positioned about a section of the shaft. The section of the shaft has an arcuate keyway portion. A key with an arcuate surface is positioned between the arcuate keyway and the gear keyway, and has a first end portion and a second end portion. A threaded fastener threadably engages a bore in the gear and has a head sufficiently large to initially deform the interior surface of the bore. A distal end of the fastener engages the first portion of the key such that the key slides along the arcuate keyway to bring the second portion into deformable engagement with the interior surface of the gear keyway. The fastener is held securely in place by an interference between the interior of the bore and the head of the fastener. With the threaded fastener being securely held by the interior surface of the bore, the second end portion of key is held in deformable engagement with the interior surface of the gear keyway, thereby retaining the gear in a fixed position on the shaft.

BRIEF DESCRIPTION OF THE DRAWINGS

FIG. 3 is a perspective view of a gear secured on a drive shaft of the transport rack of FIG. 2 in accordance with the present invention.

FIG. 4 is a cross sectional view of the retaining mechanism for retaining the gear on the drive shaft taken along section 4—4 in FIG. 3, with portions shown whole for purposes of clarity.

FIG. 5 is a perspective view of the drive shaft showing an arcuate keyway.

FIG. 6 is a perspective view of the set screw used in the retaining mechanism of the present invention.

FIG. 7 is an end view of the head of the set screw illustrating the size of the head in comparison with the size of the bore into which the set screw is threaded.

FIG. 8 is a fragmentary cross sectional view of the set screw showing end portions thereof deforming the surface of the bore as the set screw is initially inserted into the bore.

FIG. 9 is a fragmentary cross sectional view illustrating the surface of the bore holding the set screw in place.

DETAILED DESCRIPTION OF THE PREFERRED EMBODIMENT

Figure 1:
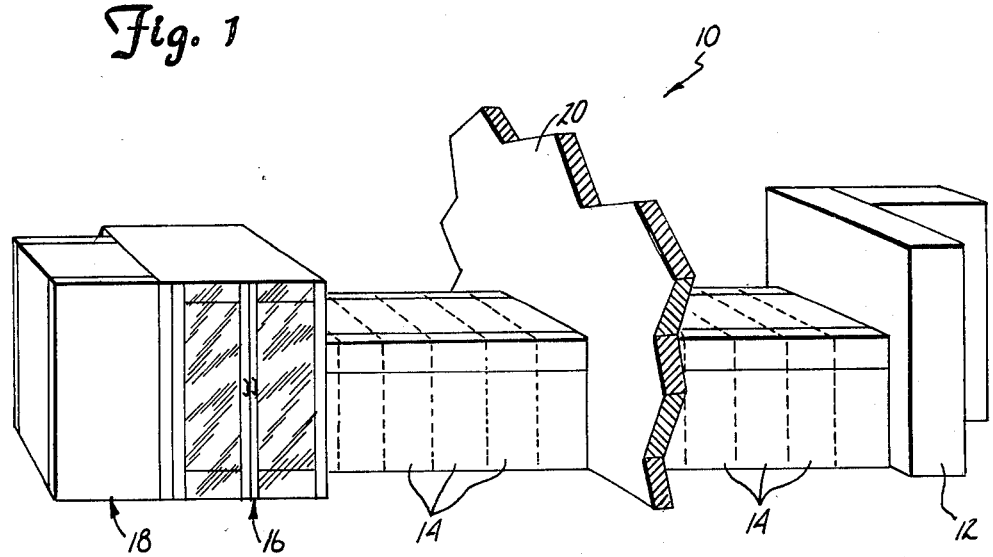
FIG. 1 is a perspective view of a cine processor.

FIG. 1 shows a typical cine processor, generally indicated at 10, for continuous processing of webs of photographic film. Photographic film is transported from a loader accumulator assembly 12 through a plurality of modular processing tanks 14, through a film dryer 16 and then to a take up assembly 18. A wall 20 divides the modular processing tanks for processing photographic film such that the film is initially processed in the absence of natural light through some of the tanks. The processing tanks 14 contain various chemicals which process the photographic film.

Figure 2:
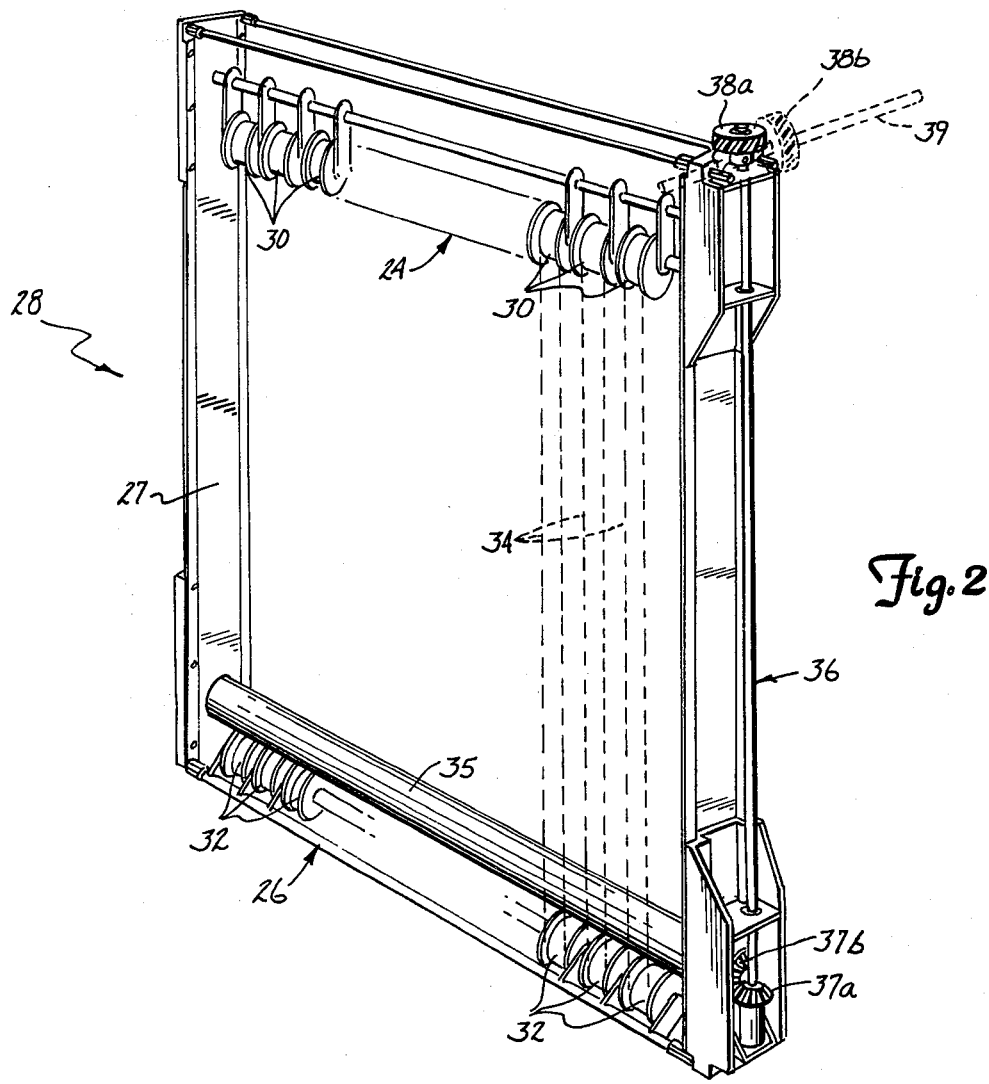
FIG. 2 is a perspective view of a film transport rack used in a cine processor.

As illustrated in FIG. 2, film 34 (indicated by broken lines) is transported through the various solutions in the tanks by sets of upper and lower transport rollers 24, 26 positioned on transport racks 28. Each set of upper and lower rollers 24, 26 includes a plurality of individual rollers 30, 32 respectively on shafts within a frame 27. The photographic film 34 engages each individual roller, starting with a first upper roller 30 of the first set of upper rollers 24 on the first rack 28. The film is then threaded onto a second lower roller 32 of the set 26 of the same rack 28. The film is then threaded upwardly to a second upper roller adjacent to the first upper roller 30 initially engaged by the film 34 and then to a second lower roller 32 until the film 34 has been threaded through the entire rack in a spiral fashion.

The film 34 is threaded from the first rack to a second rack, from one of the upper rollers of the first rack to one of the upper rollers of the second rack, and the film 34 is then threaded through the second rack in a similar fashion. In this manner, the racks 28 in the tanks 14 are threaded with the photographic film 34 contacting the various solutions in each of the tanks 14.

Each rack 28 is connected to a drive system that preferably drives the lower set of rollers 26. In particular, the lower set of rollers 26 is driven by a drive roller 35 which engages the edges of the individual rollers 32. The drive roller 35 is driven by a vertical drive shaft 36 through miter gears 37a and 37b. The vertical drive shaft 36 in turn is driven through helical gears 38a and 38b by main drive shaft 39.

Typically, the gears 37a-b are completely submersed in chemical solution and gears 38a-b are exposed directly to the vapors. These chemicals are corrosive to most conventional materials used in the making of gears. Consequently, the materials for making the gears that are suitable for photographic film processing apparatus are limited in number.

Miter gear 37a and helical gear 38a are fixedly attached to the lower and upper ends of vertical drive shaft 36, respectively, and miter gear 37b is fixedly attached to one end of drive roller 35. The manner of attachment of these gears to roller 35 and shafts 36 and 39 is critical in a cine processor. If the gears 37a-b and 38a are not attached securely to their respective shafts, the gears will become loose during the processing of the photographic film and valuable processing time will be lost and possible film damage will occur. The present invention includes a manner of attaching the gears 37a-b and 38a to roller 35 and, shaft 36 in a secure manner such that the gears will not loosen from their fixed position on the shafts.

Although only gear 38a is shown in FIGS. 3 and 4 and the subsequent description is directed to the gear 38a, it should be understood that gears 37a-b and 38a are all attached in the same manner and are made from the same material. As shown in FIGS. 3 and 4, the gear 38a has a central coaxial aperture 42 which circumferentially surrounds a section 44 of the shaft 36, as shown in FIGS. 3 and 4. The section 44 has a shaft keyway 46 longitudinally positioned with an arcuate surface 47, as illustrated in FIG. 5. A woodruff key 48 has an arcuate surface 50 that engages and cooperates with the arcuate surface 47 of shaft keyway 46. The key 48 further includes an upper end portion 52 and a lower end portion 54 and preferably has a planar surface that faces an interior wall 56 of a gear keyway 58 in the gear 38a. A portion of the woodruff key 48 extends beyond the surface of the shaft 36 and is positioned within the gear keyway 58.

The gear 38a is held in position on the shaft section 44 by a set screw 60 having a threaded portion 62, a head 64 and a distal end 66. Set screw 60 is shown in FIGS. 3 and 4, and is further illustrated in FIGS. 6 and 7. The set screw 60 threadably engages a bore 68 in the gear 38a. The bore 68 has an interior surface 70 with a threaded portion 62. The bore 68 is positioned such that one of the end portions 52 or 54 of key 48, preferably the lower end portion 54, is engaged by the distal end 66 when the set screw 60 is inserted into the bore 68.

The head 64 of the set screw 60 has corners 67 whose distance from the central axis of the set screw 60 is slightly greater than the radius of the bore 68, as illustrated in FIG. 7. The head 64 preferably has a substantially square cross sectional configuration, however, other configurations having corner portions whose distance from the central axis of the set screw is greater than the radius of the bore 68 are within the scope of the present invention.

The inner surface 70 of the bore 68 is made of a material that is initially deformable and has a memory such that the inner surface 70 will return to its original shape where possible. Preferably, the entire gear is made of this material. The material must also have sufficient strength and rigidity to support gear teeth and perform the function of a gear in a drive system. One such material which has been incorporated in a working embodiment of the present invention is an ultra-high molecular weight polyethylene (UHMWPE) having a molecular weight in excess of 1,000,000. UHMWPE has an exceptional notched impact strength, a high energy absorption capacity and good stress crack resistance. These qualities permit relatively high loads and deformations without fracture, and a capacity to gradually relieve internal stresses—accommodating induced deformation. The transformation is substantially completed within two weeks although the greatest effects are realized within twenty-four hours. In addition, UHMWPE is sufficiently "soft" to dampen transient forces and vibrations transferred through the gear to the set screw, reducing impact "spikes" that can loosen fasteners in more rigid materials. UHMWPE is also resistant to chemical attack from the various chemicals in the tanks.

UHMWPE has excellent "wear" properties including self-lubrication and abrasion resistance, and the life of the gears is increased through the use of this material. However, cooperating gears made of UHMWPE will prematurely wear due to adhesive tendencies of like materials when surface temperatures are increased due to frictional contact. Characteristically, plastic materials have relatively low values of thermal conductivity that lead to concentrations of heat and surface temperature during operation. Wear is greatly accelerated by uncontrolled temperature increases. Gear 38a is especially susceptible to temperature rise as it is operated in helical engagement having much higher values of sliding velocity than the largely rolling contact of gears 37a-b. The metal gear 38b is used to mesh with gear 38a to provide a dissimilar material and an effective heat sink for increased life. Gears 37a and 37b, although both are made of UHMWPE, have a controlled surface temperature due to their location in a constant temmperature chemical solution.

The preferred UHMWPE is sold by several companies and has a specific gravity of approximately 0.94. Some of the companies and the brand names under which the UHMWPE is sold are:

| 1. | American Hoechst Corporation of New Jersey | Hostalen GUR |
| --- | --- | --- |
| 2. | Cadillac Plastic and Chemical Co. of Michigan | HI-FAX 1900 |
| 3. | Dixon Corporation of Rhode Island | Pennlon |
| 4. | Garland Manufacturing Company of Maine | Gar-dur |

-continued

| 5. | Hercules Incorporated of Delaware | 1900 UHMW Polymer |
| 6. | The Polymer Corporation of Pennsylvania | Ultra-Wear UHMWPE |

Other materials having properties similar to UHMWPE are also includable within the present invention. Likewise, other components may be used. The concept is equally applicable to sprockets, pulleys, couplings or other hub-shaft combinations. Any material having suitable pliancy will not fracture when the set screw 60 is screwed into the bore 68. Metals are excluded because of a characteristically high stiffness and an inability to absorb and dissipate stress energy. It is often difficult to obtain quantitative values of energy absorption capacity, stress dissipation qualities, or stress crack resistance on an absolute scale. Surrogate measures of these qualities, however, are available in terms of various ASTM test procedures commonly used to describe physical properties. Perhaps the most significant of these indicators is Method A of ASTM Standard D256—the industry-accepted standard for measuring the impact resistance of plastic materials. In this test, a "standardized" sample is formed and notched to specific dimensions; and held as a cantilerer beam in a vertical position. A pendulum-type hammer is then left to fall from a specified height which provides a fixed velocity at the moment of impact. The test fixture includes a pointer and dial mechanism to indicate the excess energy remaining in the pendulum after breaking the specimen. The loss of energy in the pendulum is a direct measurement of the energy absorption of the material specimen. In contrast to most polymer materials, UHMWPE does not break when subjected to this test. Other suitable plastics would also show highly favorable results in this test. Metals are not appropriate because of the lack of internal relaxation. They cannot absorb the stresses imposed by a tightened set screw, and simply store them in the form of potential energy. The energy is retained only by the contact friction between mating parts, and acts to loosen the parts when induced by impact or vibration.

Presently, the gear 38a is formed by machining a solid piece of UHMWPE to obtain the desired configuration of the gear. Alternatively, the UHMWPE may be initially heated and then forged into the desired gear configuration using a mold.

In use, the set screw 60 is threadably inserted within the bore 68 and the corners 67 of the head 64 deform the inner surface 70, as illustrated in FIG. 7. The distal end 66 of the set screw engages the lower end portion 54 of the woodruff key 48 slidably moving the woodruff key 48 along the arcuate surface 47 of the shaft keyway 46. The upper end portion 52 of the woodruff key 48 engages the inner surface 56 of the gear keyway 58, embedding within the surface 56. The woodruff key 48 fixedly retains the gear 38a in position in an angular direction on the shaft 36 by being positioned within the gear keyway 58 of the gear 38a and securely retains the gear in a vertical position on the shaft by having upper end portion 52 embedded within the surface 56, and also protruding above the distal end 66 of the set screw 60, as shown in FIG. 4.

The set screw 60 retains the woodruff key 48 in position with the upper end portion 52 embedded within the surface 56, and also protruding above the distal end 66 of the set screw 60, as shown in FIG. 4. The set screw 60 retains the woodruff key 48 in position with the upper end portion 52 embedded within the surface 56. The set screw 60 is securely retained within the bore 68 by the tendency of the "stretched" interior surface 70 to "relax", thus assuming slight indentations at the points of interference. These small depressions become permanent as the material relaxes and assumes a non-circular shape that effectively resists loosening of the set screw as illustrated in FIG. 9. The set screw 60 is securely retained within the bore 68 and will not move, thereby securely retaining the woodruff key 48 in position and the gear 38 on the shaft 36.

The retaining mechanism of the present invention has several distinct advantages over prior art retaining systems.

First, two points of support are provided for the gear 38a on the drive shaft 36. The set screw 60 in contact with the lower end portion 54 of the key 48 provides one point of support, and the upper end portion 52 of the key 48 embedded past the surface 56 into the gear 38a provides a second point of support. The second point of support is preferably in the same plane as the gear teeth 40, so as to brace a section of the gear 38a that receives a revolving radial load during operation. Support at two points prevents a rocking and wedging action that occurs with a single, eccentric point of support and eliminates the high leverage of the external load on the set screw. Magnified forces acting on the set screw produce loosening when fluctuations exceed the preload force applied to the set screw when installed. Loosening is common when preload alone is used to maintain tightness and a single set screw is mounted eccentrically to the primary load. These conditions are characteristic of conventional methods. Loosening tendencies are exaggerated by vibrations or sharp impact forces that are largely uncontrollable in such applications. The present invention incorporates two-point support and includes support directly beneath the external load, thereby eliminating radial wobble of the gear and the extraordinary mechanical advantage of force otherwise imparted to the set screw. The effects of uncontrollable impulse loads and vibrations are thus minimized.

Second, the woodruff key 48 acts both as a pawl that prevents downward movement with a tip of the upper end portion 52 embedded past the surface 56, and an inclined surface that prevents the set screw 60 from sliding upward on the key 48. Any upward force on the gear only tends to embed the upper end of the key deeper into the surface 56. Thus, the gear is effectively held from movemment in either axial direction by the inclined top surface of the key 48. Preferably, the lower end portion 54 forms an angle of approximately 5° between the planar surface of the key and the surface 56 of the gear keyway 58, as illustrated in FIG. 4. Correspondingly, a tangent line (shown broken) tangent to the arcuate surface 50 of the key 48 proximate the tip of the upper end portion 52 forms an angle of approximately 90° with the surface 56 of the gear keyway 58. Removal of the gear 38a is accomplished by disengaging the set screw from the surface of the key 48 and moving the distal end 66 above surface 56 of the keyway. Upward movement of the gear 38a then rotates the key out of embedded engagement and sufficient clearance between the key and keyway surface 56 provides easy removal.

Third, the retaining mechanism relies on energy dissipation (material relaxation) instead of energy retention as in conventional methods. The tendency to loosen is removed as there is no internally stored preload to contribute to instability of the system. Conventional approaches use high preload forces to maintain tightness, creating a high potential energy that cannot be relieved except by loosening, and system integrity, therefore, often cannot be reliably maintained for long periods of time. Relaxation of a plastic material, however, minimizes the internal potential energy of the system and plastic flow insures that the preload is limited and maintained as a function of the creep modulus over substantial time periods. The inherent potential energy of the system is kept at a low level minimizing the tendency to work loose. The present invention uses material compliance (eventual "set") produced by a characteristic relaxation to lock components together with permanent deformations, and to insure long-term reliability by minimizing the internal potential energy level while maintaining the maximum holding power dictated by the material yield point. Maximum retention forces are limited by material yield points. Plastic flow (permanent deformation) insures that the yield point has been reached. The high damping characteristics of a "soft" material assure a reduction of peak impact disturbances that are transmitted to the component interface, and a general reduction in overall noise levels during operation. This is especially important when a multiple of gear sets are used as is typical in film processors.

Fourth, the present invention provides several manufacturing and assembly economies compared to conventional methods. Larger tolerances can be used as material deformation requires less accuracy of mating parts. Gear tooth accuracy is not as critical as vibrations are largely absorbed and have less impact on loosening. Standard key and key seat dimensions can be used, permitting hubs to be retrofit to existing shafts using commercially available keys if desired. Torque requirements for the set screw are low and less critical, and a flat on the shaft is not required to avoid raising burrs as with direct set screw contact on the shaft surface. Also, because retaining rings or collars are not required, the gear sides can be used directly as effective thrust bearing surfaces, minimizing the axial loads carried by the shaft, key, and setscrew.

CONCLUSION

The retaining mechanism of the present invention securely retains the gear in a drive system of a photographic processor. The head 64 of the set screw 60 is retained by the material constituting the gear such that the set screw 60 will not move within the bore 68 thereby ensuring that the woodruff key 48 is embedded within the surface 56, retaining the gear in its original position on the shaft.

Although the present invention has been described with reference to the preferred embodiment, persons skilled in the art will recognize that changes may be made in form and detail without departing from the spirit and scope of the present invention.

What is claimed is:

1. Improved gear apparatus for use in a drive system of a processor of photosensitive material, the improvement comprising:
   a shaft with a first keyway having a first arcuate surface;
   a gear with a coaxial aperture having an interior surface positioned about the shaft over the first keyway and a bore having an interior surface and communicating with the aperture, the gear being made of an ultra-high molecular weight polyethylene;
   a key having a second arcuate surface cooperating with the first arcuate surface and a first end portion and a second end portion with the first end portion communicating with the bore;
   means for engaging the first portion of the key through the bore such that the key when engaged slides along the first arcuate keyway and the second portion of the key deformably engages the interior surface of the aperture, the means for engaging being sufficiently large to initially deform the interior surface of the bore such that the interior surface of the bore securely holds the means for engaging thereby securely retaining the gear in a fixed position on the shaft.

2. The invention of claim 1 wherein the ultra-high molecular weight polyethylene has a molecular weight in excess of one million.

3. The invention of claim 1 wherein the gear has a second keyway positioned longitudinally with respect to the shaft for receiving the first and second end portions of the key.

4. The invention of claim 1 wherein the means for engaging is a set screw having a threaded portion, a head portion and a distal end, the distal end engaging the first end portion of the key and the head portion deformably engaging the interior surface of the bore and held therein such that the set screw retains the second end portion of the key in engagement with the interior surface of the aperture.

5. The invention of claim 4 wherein the head of the set screw is of a rectangular configuration having corners whose distance from a central axis of the set screw is greater than a radius of the bore such that the corners deformably engage the interior surface of the bore.

6. Gear apparatus in combination with a drive system of a processor of photosensitive material, the combination comprising:
   a shaft with a first keyway having a first arcuate surface;
   a gear with a coaxial aperture having an interior surface positioned about the shaft over the first keyway and a bore having an interior surface and communicating with the aperture, the gear being made of an ultra-high molecular weight polyethylene;
   a key having a second arcuate surface cooperating with the first arcuate surface and a first end portion and a second end portion with the first end portion communicating with the bore;
   a set screw having a threaded portion, a head portion and a distal end, the distal end engaging the first end portion of the key through the bore such that the key when engaged slides along the first arcuate keyway and the second portion of the key deformably engages the interior surface of the aperture, and the head portion is of a substantially square cross sectional configuration having corners whose distance from the central axis of the screw is greater than the radius of the bore such that the corners deformably engage the interior surface of the bore so that the interior surface of the bore securely holds the head portion such that the set screw retains the second end portion of the key in engagement with the interior surface of the aperture thereby securely retaining the gear in a fixed position on the shaft.

7. The apparatus of claim 6 wherein the ultra-high molecular weight polyethylene has a molecular weight in excess of one million.

8. The apparatus of claim 6 wherein the gear has a second keyway positioned longitudinally with respect to the shaft for receiving the first and second end portions of the key.

9. A retaining mechanism having a gear and a shaft, the gear being retained in a fixed position on the shaft, the shaft being a component of a drive system of a processor of photosensitive material, the gear having a coaxial first aperture with an interior surface and a bore having an interior surface and communicating with the aperture, the mechanism comprising:
a section of the shaft positioned coaxially within the aperture of the gear, having a first keyway with a first arcuate surface;
a key having a second arcuate surface and a first end portion and a second end portion with the first end portion communicating with the bore; and
means for engaging the first portion of the key by extending through the bore such that the key when engaged slides along the first arcuate keyway and the second portion of the key deformably engaging the interior surface of the aperture, the means for engaging being sufficiently large to initially deform the interior surface of the bore such that the interior surface of the bore securely holds the means for engaging thereby securely retaining the gear in a fixed position on the shaft.

10. The mechanism of claim 9 wherein the interior surfaces of the aperture and bore are made of an ultra-high molecular weight polyethylene.

11. The mechanism of claim 10 wherein the entire gear is made of an ultra-high molecular weight polyethylene.

12. The mechanism of claim 11 wherein the ultra-high molecular weight polyethylene has a molecular weight in excess of one million.

13. The mechanism of claim 9 wherein the gear has a second keyway positioned longitudinally with respect to the shaft for receiving the first and second end portions of the key.

14. The mechanism of claim 9 wherein the means for engaging is a set screw having a threaded portion, a head portion and a distal end, the distal end engaging the first end portion of the key and the head portion deformably engaging the interior surface of the bore and held therein such that the set screw retains the second end portion of the key in engagement with the interior surface of the aperture.

15. The mechanism of claim 14 wherein the head of the set screw is of a rectangular configuration having corners whose distance from a central axis of the screw is greater than a radius of the bore such that the corners deformably engage the interior surface of the bore.

16. A transport rack for transporting photosensitive material through a chemical solution in a processor having a drive system, the rack comprising:
a frame;
upper and lower transport roller means rotatably mounted within the frame for engaging the photosensitive material; and
transport rack drive means for conveying power from the drive system for transporting the photosensitive material including a plurality of gears attached to shafts of the transport rack drive means, each gear having a bore communicating with the shaft and an exterior surface of the gear, the bore being deformably engaged by a set screw and the shaft being engaged by a distal end of the screw thereby retaining the gear in a fixed position on the shaft, the gear being made of ultra-high molecular weight polyethylene characterized by an ability to deform without fracture and then to relax around the set screw securely retaining the set screw and characterized by sufficient strength and rigidity to support gear teeth used in the drive system of the processor.

17. The rack of claim 16 wherein the transport drive means further includes:
a drive roller driveably engaging the lower transport roller means;
a transport rack drive shaft rotatably attached within the frame for transferring power from the drive system to the drive roller means; and
wherein the plurality of gears made of ultra-high molecular weight polyethylene include a first gear fixedly attached to one end of the transport rack drive shaft connecting said drive shaft to the drive system, a second gear fixedly attached to another end of the transport rack drive shaft, and a third gear fixedly attached to one end of the drive roller and cooperating with the second gear such that power is transferred from the transport rack drive shaft to the drive roller means and to the lower transport roller means.

18. The rack of claim 16 wherein the ultra-high molecular weight polyethylene has a molecular weight in excess of one million.

* * * * *